(12) United States Patent
Yang et al.

(10) Patent No.: US 10,404,323 B2
(45) Date of Patent: Sep. 3, 2019

(54) NEAR FIELD MAGNETIC INDUCTION COMMUNICATION OVER MULTIPLE CHANNELS

(71) Applicant: Starkey Laboratories, Inc., Eden Prairie, MN (US)

(72) Inventors: Zhenchao Yang, Eden Prairie, MN (US); Stephen Paul Flood, Eden Prairie, MN (US); Greg Haubrich, Champlin, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 388 days.

(21) Appl. No.: 15/335,203

(22) Filed: Oct. 26, 2016

(65) Prior Publication Data
US 2018/0115050 A1  Apr. 26, 2018

(51) Int. Cl.
*H04R 25/00* (2006.01)
*H04B 5/00* (2006.01)

(52) U.S. Cl.
CPC ......... *H04B 5/0031* (2013.01); *H04B 5/0075* (2013.01); *H04B 5/0081* (2013.01); *H04R 25/552* (2013.01); *H04R 25/554* (2013.01); *H04R 25/558* (2013.01); *H04R 2225/51* (2013.01)

(58) Field of Classification Search
CPC .... H04R 25/43; H04R 25/552; H04R 25/554; H04R 25/558; H04R 2225/51; H04B 5/0012; H04B 5/0031; H04B 5/0075; H04B 5/0081; H04W 4/80

USPC ..... 381/23.1, 312, 315, 321; 455/41.1, 41.2, 455/550.1, 575.1; 343/702, 787, 867
See application file for complete search history.

(56) References Cited

U.S. PATENT DOCUMENTS

| | | | | |
|---|---|---|---|---|
| 5,966,641 A | * | 10/1999 | Flowerdew | H01Q 7/00 343/867 |
| 6,924,767 B2 | * | 8/2005 | Kitahara | H01Q 1/3241 343/702 |
| 9,124,303 B2 | * | 9/2015 | Maenpaa | H04B 5/0006 |
| 2010/0109953 A1 | | 5/2010 | Tang | |

(Continued)

FOREIGN PATENT DOCUMENTS

DE  202014000874  3/2014

*Primary Examiner* — Huyen D Le
(74) *Attorney, Agent, or Firm* — Hollingsworth Davis, LLC

(57) ABSTRACT

A hearing device includes first, second, and third antennas oriented respectively along first, second, and third axes that are different from one another. The device includes first channel circuitry coupled to transceive and process antenna signals of each of the antennas. The antennas and the first channel circuitry communicate with another hearing device via a near field magnetic induction (NFMI) signal through a first near field magnetic induction (NFMI) communication channel. Second channel circuitry is coupled to transceive and process the antenna signals of each of the antennas. The antennas and the second channel circuitry communicate with the other device via the NFMI signal through a second NFMI communication channel. Third channel circuitry is coupled to transceive and process the antenna signals of each of the antennas. The antennas and the third channel circuitry communicate with the other device via the NFMI signal through a third NFMI communication channel.

18 Claims, 7 Drawing Sheets

(56) References Cited

U.S. PATENT DOCUMENTS

| | | |
|---|---|---|
| 2012/0140761 A1 | 6/2012 | Aerts |
| 2013/0178153 A1 | 7/2013 | Thoen |
| 2014/0169570 A1* | 6/2014 | Kalluri .................. H04R 25/552 381/23.1 |
| 2016/0105924 A1 | 4/2016 | Baek et al. |
| 2016/0249140 A1 | 8/2016 | Nikles et al. |

* cited by examiner

NEAR FIELD MAGNETIC INDUCTION COMMUNICATION OVER MULTIPLE CHANNELS

TECHNICAL FIELD

This application relates generally to hearing devices and to methods and systems related to such devices.

BACKGROUND

Near Field Magnetic Induction (NFMI) communication can be used for communication between two or more hearing devices worn by a user, such as hearing aids and hearables worn at left and right ears. NFMI communication signals can be transferred between a transmitter of one hearing device and a receiver of the other hearing device through magnetic coupling between the transmitter and receiver coils. The NFMI communication signals between the hearing devices can be used for audio streaming from one hearing device to the other hearing device, and/or for transfer of control and/or synchronization signals, for example.

SUMMARY

Some embodiments disclosed herein are directed to wearable devices, such as hearing devices, which communicate with each other. According to some embodiments, a device includes first, second, and third antennas oriented respectively along first, second, and third axes that are different from one another. The device includes first channel circuitry coupled to each of the antennas and configured to transceive and process antenna signals of each of the antennas. The antennas and the first channel circuitry communicate with another device via a near field magnetic induction (NFMI) signal through a first near field magnetic induction (NFMI) communication channel. Second channel circuitry is coupled to each of the antennas and is configured to transceive and process the antenna signals of each of the antennas. The antennas and the second channel circuitry communicate with the other device via the NFMI signal through a second NFMI communication channel. Third channel circuitry is coupled to each of the antennas and is configured to transceive and process the antenna signals of each of the antennas. The antennas and the third channel circuitry communicate with the other device via the NFMI signal through a third NFMI communication channel.

Some embodiments involve a hearing system at includes two devices as described above. The first hearing device and the second hearing device communicate with each other through the first, second, and third NFMI channels.

Some embodiments are directed to a method of operating a hearing system. A first hearing device and a second hearing device communicate through at least first and second independent near field magnetic induction (NFMI) communication channels. An NFMI signal is transmitted from one or more of a first magnetic antenna and a second magnetic antenna of the first device. The first magnetic antenna of the first device is oriented along a first axis and the second magnetic antenna of the first device is oriented along a second axis different from the first axis. The NFMI signal is detected at one or more of a first magnetic antenna and a second magnetic antenna of the second device. The first magnetic antenna of the second device is oriented along a third axis and the second magnetic antenna of the second device is oriented along a fourth axis that is different from the third axis. The second device outputs a first antenna signal in response to a first magnetic polarization component of the detected NFMI signal and outputs a second antenna signal in response to a second magnetic polarization component of the detected NFMI signal. The gain and/or phase of each of the first and second antenna signals is adjusted and the adjusted first and second signals are combined.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
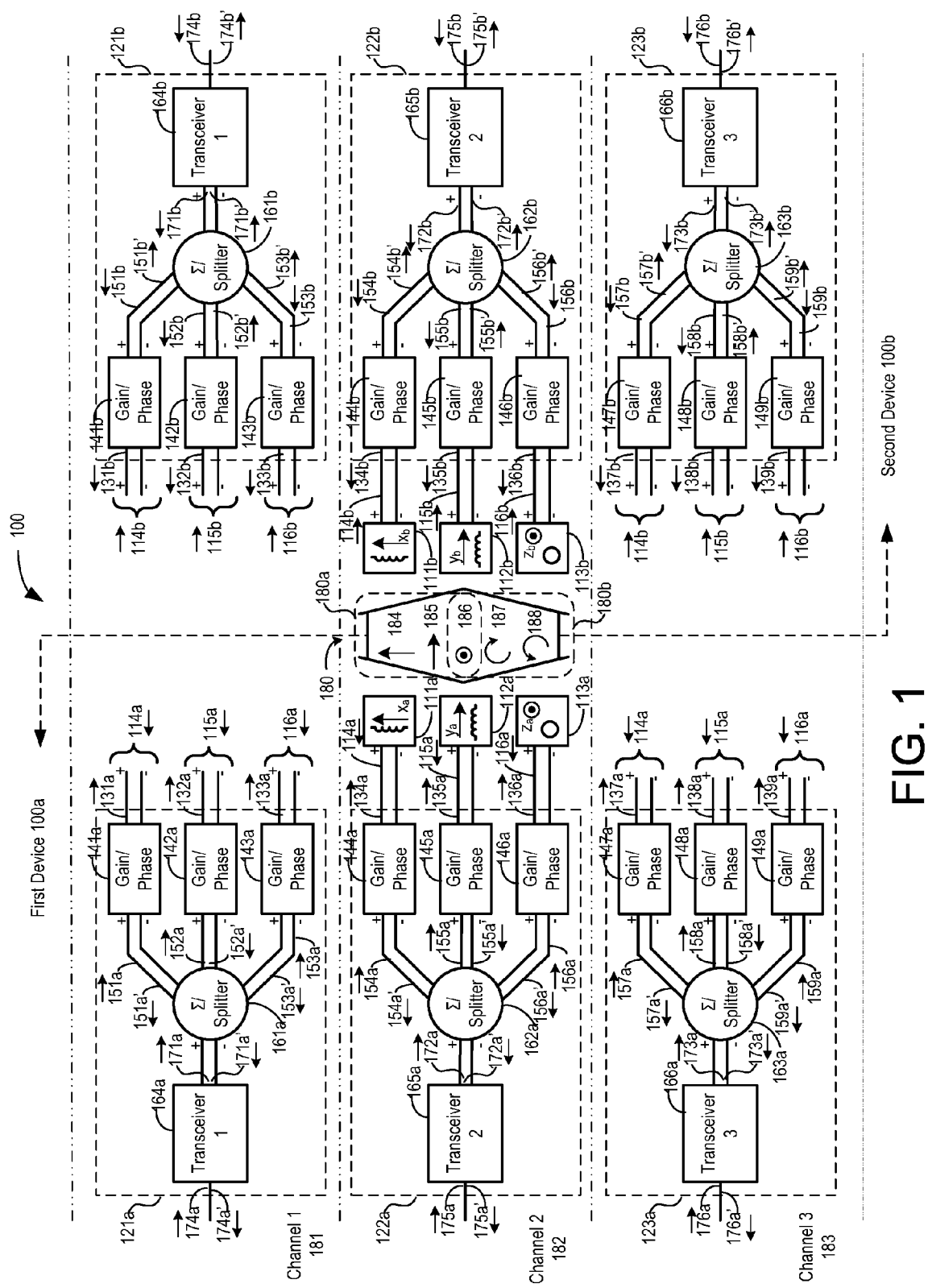
FIG. 1 is a block diagram of a hearing system comprising first and second hearing devices configured to communicate through multiple near field magnetic induction (NFMI) communication channels in accordance with various embodiments.

Near field magnetic induction (NFMI) communication is particularly useful for providing communication between hearing devices due in part to the negligible loading effect of the human body for magnetic signals. A typical design uses one NFMI transmit coil in the transmitting device and one NFMI receive coil in the receiving device. Such a design presumes a relatively tight tolerance on the alignment between the transmit and receive coils and/or a relatively large link margin, e.g., the margin between the receiver's sensitivity and the received power. Coaxial alignment between transmit and receive NFMI coils of the pair of hearing devices is common because of the additional link margin obtained with coaxial alignment as compared with coplanar alignment. However, designs that rely on coaxial alignment are particularly sensitive to the alignment accuracy. Due to off-axis positioning of the transmit and receive coils in communicating hearing devices, the performance of the NFMI communication channel between the hearing devices may vary for different users and/or may vary for the same user over time as the alignment of the hearing devices changes.

In some implementations, bidirectional audio streaming and bidirectional data streaming are multiplexed on the NFMI channel. This leads to a high data rate and a high NFMI channel bandwidth, which in turn leads to a lower quality factor (Q). The NFMI channel typically uses a resonant tank as a magnetic "antenna". The Q of the link increases the link budget by Q multiplication. With an increased bandwidth for bidirectional audio streaming and bidirectional data, the Q multiplication is reduced and the link budget is reduced. When interleaving time-critical data along with time-critical audio streaming communications, excessive latency can affect data, audio, or both.

Some approaches described in this disclosure are directed to systems involving multiple devices that communicate over multiple orthogonal NFMI communication channels. These approaches address the issues of antenna alignment and bandwidth. As described in more detail below, multiple communication channels can be created using two or three coil antennas, e.g., arranged along orthogonal axes. The two or more coils are used to form at least two independent NFMI communication channels between first and second hearing devices, e.g., left side and the right side hearing devices of a hearing system. Each communication channel relies on a magnetic polarization component that is orthogonal to the magnetization component used by other channels. The multi-channel approach disclosed herein provides communication between hearing devices that is relatively insensitive to antenna misalignment and that can support high data throughput, allowing for audio streaming and control signals to be transferred between the hearing devices. The multiple communication channels can operate independently, simultaneously, and at the same carrier frequency.

Various embodiments described herein involve devices that communicate over multiple orthogonal channels via an NFMI signal transceived by multiple magnetic antennas, e.g., inductive coils, oriented respectively along different axes. The gain and/or phase adjustment of the antenna signals for each channel described in more detail below can be used to enhance the signal to noise ratio (SNR) or the carrier to noise plus interference ratio (C/(N+I)) of the NFMI signal. The approaches described herein involve intentionally creating a "magnetic null" for one or more of the channels to provide adequate isolation between the channels to create and sustain three independent and simultaneous data channels.

According to some embodiments, the bandwidth (BW) on all the communication channels may be about the same. Having substantially the same BW on each of the communication channels enables Q multiplication of the magnetic communication link between the hearing devices. Additionally, having substantially the same BW on each of the communication channels enables the use of gain and/or phase adjustments that cover each axis with the same BW, providing enhancement of the carrier to noise plus interference ratio of each signal.

FIG. 1 illustrates a system 100 comprising a first device 100a and a second device 100b that communicate over up to three independent orthogonal communication channels 181, 182, 183. In some embodiments, the first and second devices are hearing devices.

The first hearing device 100a includes a first magnetic antenna 111a oriented along a first physical axis, xa, a second magnetic antenna 112a oriented along a second physical axis, ya, different from xa, and a third magnetic antenna 113a oriented along a third physical axis, za, different from xa and ya. In some embodiments, the physical axes xa, ya, za along which the antennas 111a, 112a, 113a are oriented may be orthogonal to one another. However, the physical axes need not be orthogonal so long as the magnetic fields of the antennas 111a, 112a, 113a are orthogonal or have orthogonal components.

The antennas 111a, 112a, 113a and the first channel circuitry 121a of the first hearing device 100a are configured to communicate with the second hearing device 100b through the first NFMI communication channel 181. The antennas 111a, 112a, 113a and the second channel circuitry 122a of the first hearing device 100a are configured to communicate with the second hearing device 100b through the second NFMI communication channel 182. The antennas 111a, 112a, 113a and the third channel circuitry 123a of the first hearing device 100a are configured to communicate with the second hearing device 100b through the third NFMI communication channel 183.

The antennas 111a, 112a, 113a receive NFMI signals 180 from the second device 100b and transmit NFMI signals 180 to the second device 100b. The antennas 111a, 112a, 113a generate input antenna signals 114a, 115a, 116a in response to the NFMI signals 180 received from the second hearing device 100b. Input antenna signals 114a, 115a, 116a are signals received by the first hearing device and the arrows under the numbers 114a, 115a, 116a in FIG. 1 indicate the direction of communication for signals transmitted from the second hearing device 100b and received by the first hearing device 100a. As shown in FIG. 1, the first hearing device 100a includes first 121a, second 122a, and third 123a channel circuitry. When operating in input mode, the first 121a, second 122a, and third 123a channel circuitry are configured to process the input antenna signals 114a, 115a, 116a of the antennas 111a, 112a, 113a.

The channel circuitry 121a, 122a, 123a of the first hearing device 100a may be reciprocal circuitry in that the channel circuitry 121a, 122a, 123a can both receive signals from the second hearing device 100b and transmit signals to the second hearing device 100b. In output mode, the first channel circuitry 121a is configured to provide output antenna signals 131a, 132a, 133a to the antennas 111a, 112a, 113a, respectively; the second channel circuitry 122a is configured to provide output antenna signals 134a, 135a, 136a to the antennas 111a, 112a, 113a, respectively; and the third channel circuitry 123a is configured to provide output antenna signals 137a, 138a, 139a to the antennas 111a, 112a, 113a, respectively. Output antenna signals 131a-139a are signals transmitted by the first hearing device 100a and the arrows over the numbers 131a-139a in FIG. 1 indicate the direction of communication for signals transmitted from the first hearing device 100a to the second hearing device 100b.

In some embodiments, the output antenna signals 131a, 134a, 137a from the first, second, and third channel circuitry 121a, 122a, 123a may be combined and transmitted by antenna 111a. The output antenna signals 132a, 135a, 138a may be combined and transmitted by antenna 112a. The output antenna signals 133a, 136a, 139a may be combined and transmitted by antenna 113a.

The second hearing device 100b includes a first magnetic antenna 111b oriented along a first axis, xb, a second magnetic antenna 112b oriented along a second axis, yb, and a third magnetic antenna 113b oriented along a third axis, zb. In some implementations, the first, second, and third axes, xb, yb, zb are orthogonal axes.

The antennas 111b, 112b, 113b and the first channel circuitry 121b of the second hearing device 100b are configured to communicate with the first hearing device 100a through the first NFMI communication channel 181. The antennas 111b, 112b, 113b and the second channel circuitry 122b of the second hearing device 100b are configured to communicate with the first hearing device 100a through the second NFMI communication channel 182. The antennas 111b, 112b, 113b and the third channel circuitry 123b of the second hearing device 100b are configured to communicate with the first hearing device 100a through the third NFMI communication channel 183.

The antennas 111b, 112b, 113b receive NFMI signals 180 from the first hearing device 100a and transmit NFMI signals 180 to the first hearing device 100a. The antennas 111b, 112b, 113b generate input antenna signals 114b, 115b, 116b in response to the NFMI signals 180 received from the second hearing device 100b. Input antenna signals 114b, 115b, 116b are signals received by the second hearing device and the arrows under the numbers 114b, 115b, 116b in FIG. 1 indicate the direction of communication for signals transmitted from the first hearing device 100a and received by the second hearing device 100b. As shown in FIG. 1, the second hearing device 100b includes first 121b, second 122b, and third 123b channel circuitry. When operating in input mode, the first 121b, second 122b, and third 123b channel circuitry is configured to process the input antenna signals 114b, 115b, 116b of the antennas 111b, 112b, 113b.

The channel circuitry 121b, 122b, 123b of the second hearing device 100b may be reciprocal circuitry in that it can both receive signals from the first hearing device 100a and transmit signals to the first hearing device 100a. In output mode, the first channel circuitry 121b is configured to provide output antenna signals 131b, 132b, 133b to the antennas 111b, 112b, 113b, respectively; the second channel circuitry 122b is configured to provide output antenna signals 134b, 135b, 136b to the antennas 111b, 112b, 113b, respectively; and the third channel circuitry 123b is configured to provide output antenna signals 137b, 138b, 139b to the antennas 111b, 112b, 113b, respectively. Output antenna signals 131b-139b are signals transmitted by the second hearing device 100b and the arrows over the numbers 131b-139b in FIG. 1 indicate the direction of communication for signals transmitted from the second hearing device 100b to the first hearing device 100a.

The output antenna signals 131b, 134b, 137b from the first, second, and third channel circuitry 121b, 122b, 123b may be combined and transmitted as a first linear or rotating magnetic component of the NFMI signals 180 transmitted by antenna 111b. The output antenna signals 132b, 135b, 138b may be combined and transmitted as a second linear or rotating magnetic component of the NFMI signals 180 transmitted by antenna 112b. The output antenna signals 133b, 136b, 139b may be combined and transmitted as a third linear or rotating magnetic component of the NFMI signals 180 transmitted by antenna 113b. In addition to having multiple communication channels, embodiments described herein involve transmitting and/or receiving a magnetic signal on a plurality of axes. The gain and phase adjustment described herein can be used to enhance the signal to noise ratio of the signal (SNR) or the carrier to noise plus interference ratio (C/(N+I)).

Figure 2A:
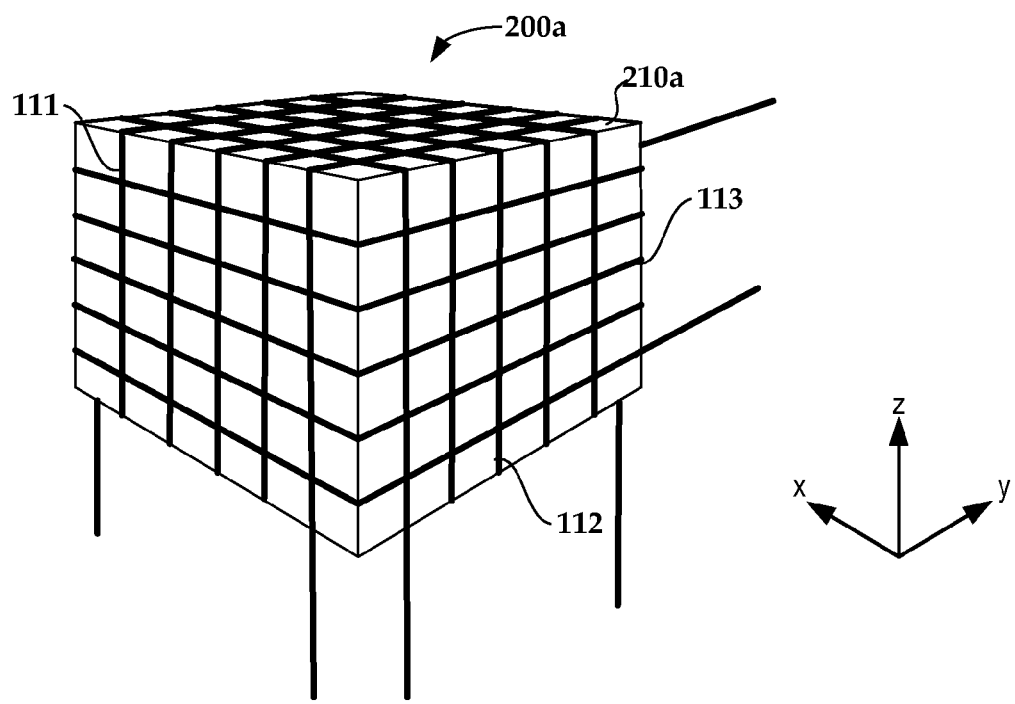
FIG. 2A illustrates an antenna structure that includes three coil antennas wound around a common hyper-rectangular core in accordance with some embodiments.
Figure 2B:
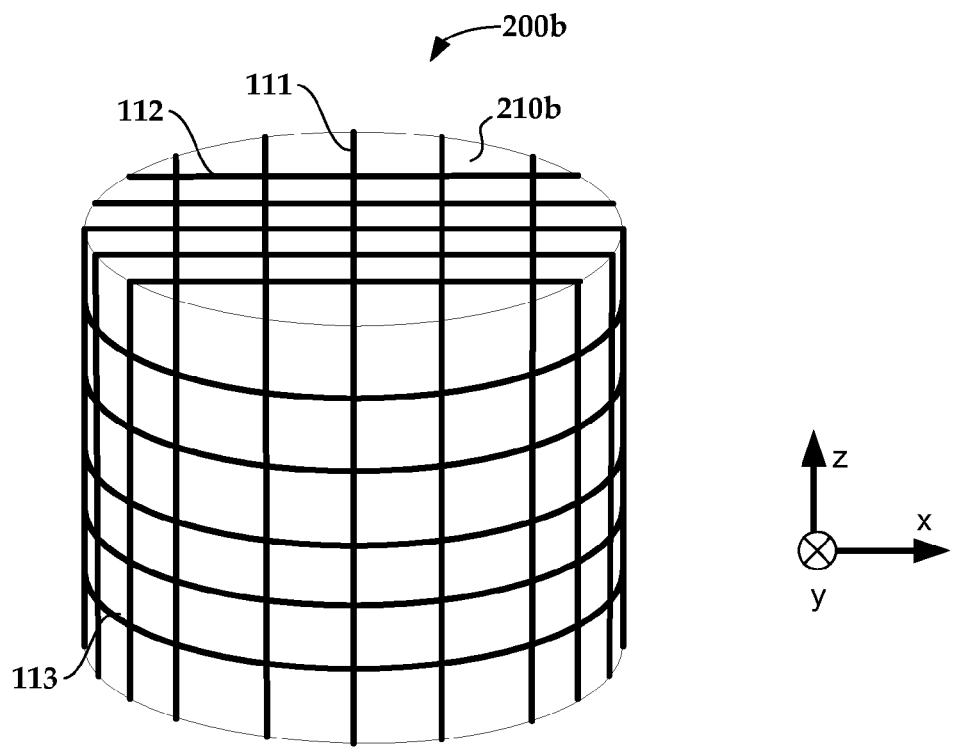
FIG. 2B illustrates an antenna structure that includes three coil antennas wound around a common cylindrical core in accordance with some embodiments.
Figure 2C:
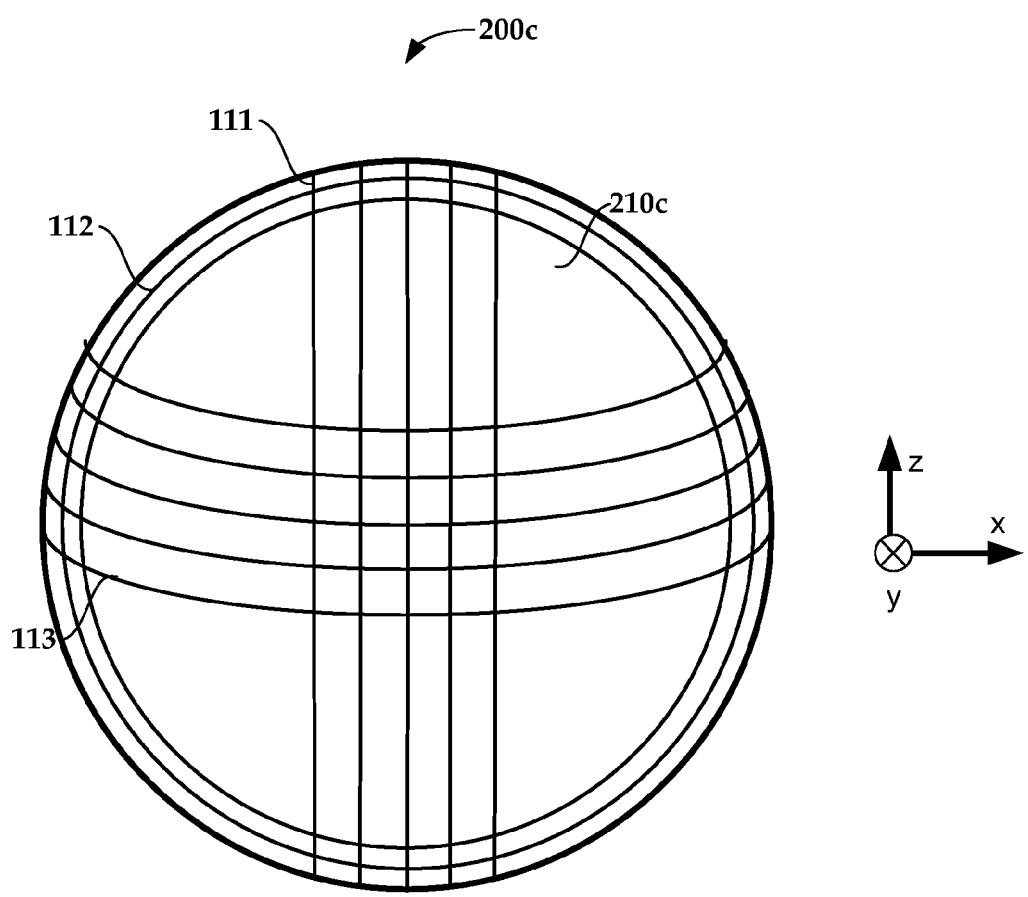
FIG. 2C illustrates an antenna structure that includes three coil antennas wound around a common spherical core in accordance with some embodiments.

In some embodiments, each of the antennas may comprise separate coils wound around separate cores. Alternatively, two antennas may be wound around one common core and one antenna may be wound around a separate core. As illustrated in FIGS. 2A-2C, winding the magnetic coils of two or more of the multiple antennas around a common core can reduce the overall size of an antenna structure comprising multiple antennas. Reducing the size of the antenna structure can be useful for compact hearing devices. The common core may be made of a ferromagnetic material having any suitable shape, such as a cube, a sphere, a rectangular cuboid, a cylinder, a three dimensional shape having grooves configured to at least partially contain the antenna windings, or any other suitable three dimensional shape.

FIG. 2A illustrates an antenna structure 200a that includes three coil antennas 111, 112, 113 oriented along orthogonal x, y, and z axes, respectively, and wound around a common hyper-rectangular core 210a. FIG. 2B illustrates an antenna structure 200b that includes three coil antennas 111, 112, 113 oriented along x, y, and z axes, respectively, and wound around a common cylindrical core 210b. FIG. 2C illustrates an antenna structure 200c that includes three coil antennas 111, 112, 113 oriented along x, y, and z axes, respectively, and wound around a common spherical core 210c. FIGS. 2A, 2B and 2C illustrate a hyper rectangular core, a cylindrical core, and a spherical core, respectively, however, in general, the common core may comprise any three dimensional shape.

In some embodiments, the antennas can be arranged to produce first, second, and third linear magnetic polarization components in an NFMI signal. As conceptually illustrated in FIG. 1, in some embodiments, communication between the first and second hearing devices 100a, 100b through the first communication channel 181 is predominantly based on the first linear polarization component 184 of the NFMI signal 180a; communication through the second communication channel 182 is predominantly based on the second linear polarization component 185 of the NFMI signal 180a; and communication through the third communication channel 183 is predominantly based on the third linear polarization component 186 of the NFMI signal 180a.

In some embodiments, two orthogonally oriented antennas can be driven to produce two oppositely rotating magnetic polarization components for two of the communication channels. As conceptually illustrated in FIG. 1, in some embodiments, communication between the first and second hearing devices 100a, 100b through the first communication channel 181 is predominantly based on the clockwise rotating polarization component 187 of the NFMI signal 180b; communication through the second communication channel 182 is predominantly based on the anticlockwise rotating polarization component 188 of the NFMI signal 180b; and communication through the third communication channel 183 is predominantly based on the third linear polarization component 186 of the NFMI signal 180b.

Figure 3A:
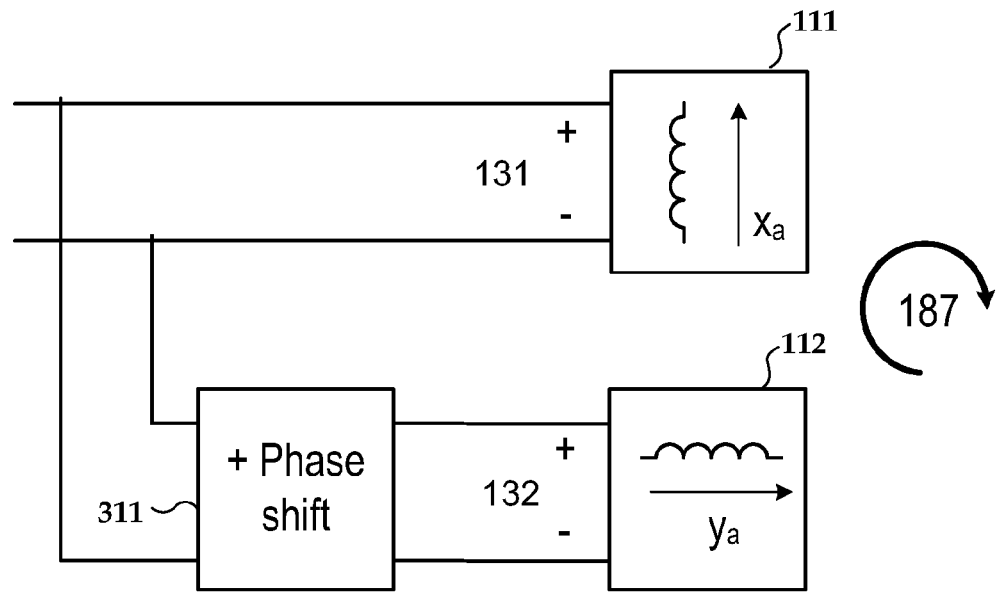
FIG. 3A conceptually illustrates an approach for producing a clockwise rotating magnetic polarization component in an NFMI signal in accordance with some embodiments.
Figure 3B:
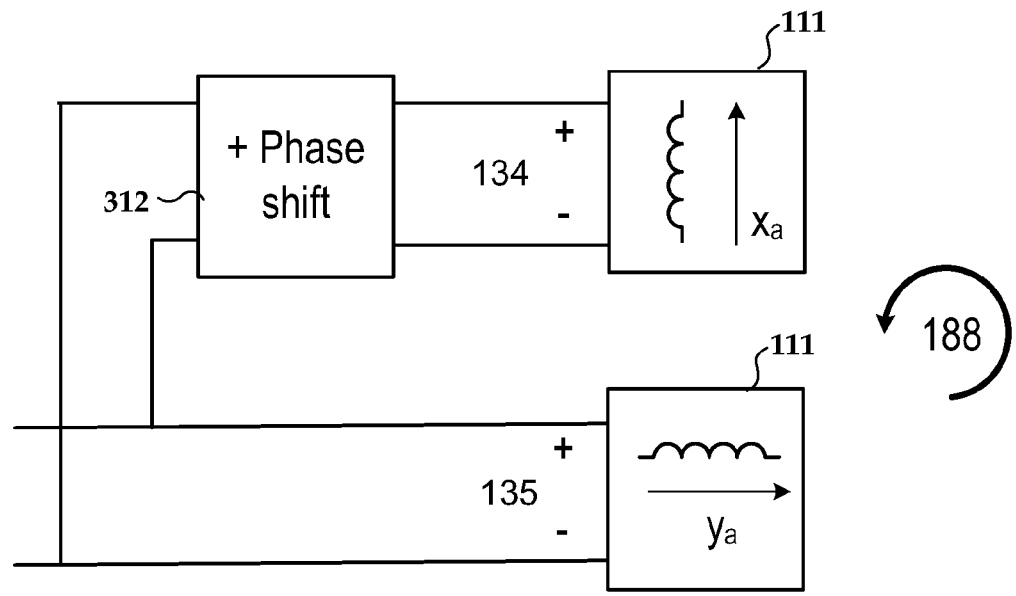
FIG. 3B conceptually illustrates an approach for producing an anticlockwise rotating magnetic polarization component in an NFMI signal in accordance with some embodiments.

Clockwise and anticlockwise rotating magnetic components in the NFMI signal 180b can be generated by shifting the phase of one of the output antenna signals with respect to another output antenna signal and driving two antennas with the phase shifted output antenna signals. The resultant NFMI signal has a magnetic polarization that rotates in either the clockwise or the anticlockwise direction depending on the direction of the phase shift. FIG. 3A illustrates an approach for generating a clockwise rotating magnetic polarization component 187 and FIG. 3B illustrates an approach for generating an anticlockwise magnetic polarization component 188. As illustrated in FIG. 3A, to produce the clockwise rotating magnetic polarization component 187, signal 132 is generated by shifting the phase of signal 131, e.g., by +90 degrees. Thus, the output antenna signal 132 is the same as signal 131 except that signal 132 is shifted in phase with respect to signal 131. The signals 131 and 132 can generate a clockwise rotating magnetic polarization component 187 in the NFMI signal 180. As illustrated in FIG. 3B, to produce the anti-clockwise rotating magnetic polarization component 187, signal 134 is generated by shifting the phase of the signal 135, e.g., by +90 degrees. Thus, the output antenna signal 134 is the same as signal 135 except that signal 134 is shifted in phase with respect to signal 135. The signals 134 and 135 generate an anti-clockwise rotating magnetic polarization component 188 in the NFMI signal 180. The phase shifter 311, 312 may comprise an analog or digital phase shifter, a delay line, or any other component that shifts the phase of a signal.

Communication between first and second hearing devices involves sending an NFMI signal from the transmitting antenna in the transmitting device to the receiving antenna in the receiving device. Ideally, the transmitting antenna and the receiving antenna are aligned along the same axis. However, slight misalignment of one of the hearing devices relative to the other hearing device will cause the antennas of the devices to also be misaligned. Misalignment of the transmit and receive antennas can lead to reception degradation, e.g., dead spots, in the communication signal.

According to embodiments disclosed herein, the use of multiple antennas respectively arranged along orthogonal axes (or arranged so that the multiple antennas generate orthogonal magnetic field components) reduces signal losses due to misalignment of the transmit and receive antennas. When the hearing devices that are transmitting and/or receiving the communication signal, signals from multiple antennas arranged along the orthogonal axes can be selected, adjusted and/or combined so that losses caused by misalignment are reduced or eliminated. According to the embodiments described herein, the channel circuitry 121*a*, 121*b*, 122*a*, 122*b*, 123*a*, 123*b* for each channel 181, 182, 183 provides for variable phase and/or phase adjustment of the input antenna signals 114*a*, 114*b*, 115*a*, 115*b*, 116*a*, 116*b* before the adjusted signals 151*a*'-153*a*', 151*b*'-153*b*', 154*a*'-156*a*', 154*b*'-156*b*', 157*a*'-159*a*', 157*b*'-159*b*' are added together. The arrows under the numbers 114*a*, 114*b*, 115*a*, 115*b*, 116*a*, 116*b* and 151*a*'-153*a*', 151*b*'-153*b*', 154*a*'-156*a*', 154*b*'-156*b*', 157*a*'-159*a*', 157*b*'-159*b*' indicate the direction of the communication.

In some embodiments, a training sequence may be used to enhance the SNR and/or C/(N+I) of the NFMI signal. As discussed in greater detail with reference to FIG. 5, a training sequence can be used in which, for each channel 181, 182, 183, the receiving device 100*a*, 100*b* slews the amplitude and phase of each input antenna signal 114*a*, 114*b*, 115*a*, 115*b*, 116*a*, 116*b* to determine phase and/or gain adjustments that provide a desired signal for the channel. The training sequence would also serve to automatically null the other two channels, providing adequate isolation between channels to create and sustain three independent and simultaneous data channels with channel circuitry 121*a*, 121*b*, 122*a*, 122*b*, 123*a*, 123*b* that includes three transceivers 164*a*, 164*b*, 165*a*, 165*b*, 166*a*, 166*b* coupled to the three orthogonally oriented antennas 111*a*, 111*b*, 112*a*, 112*b*, 113*a*, 113*b*. Each channel 181, 182, 183 may be associated with a unique preamble or other channel identification (ID) code used in conjunction with the training sequence. The channel ID would be recognized by the channel circuitry 121*a*, 121*b*, 122*a*, 122*b*, 123*a*, 123*b* of a hearing device 100*a*, 100*b* during implementation of a training sequence for the channel 181, 182, 183.

Communication between first hearing device 100*a* and second hearing device 100*b* of the hearing system 100 is described below with reference to the block diagram of FIG. 1, and FIGS. 4A and 4B. The two hearing devices 100*a*, 100*b* of hearing system 100 may communicate over multiple channels 181, 182, 183. The example of FIGS. 4A and 4B relates to the operation of one of the devices, e.g., device 100*a*, 100*b*, that is transmitting a communication signal to the other device 100*b*, 100*a* over a channel. It will be appreciated that the example provided for one channel can be extended to each of two or more channels, e.g., channels 181, 182, 183, etc. In various scenarios, device 100*a* may transmit communication signals to device 100*b* over multiple channels simultaneously; device 100*a* may receive communication signals from device 100*b* over multiple channels simultaneously; or device 100*a* may simultaneously transmit communication signals to device 100*b* over one or more of multiple channels and receive communication signals from device 100*b* over one or more of multiple channels. Each of the communication signals may be transmitted using the same carrier frequency.

The information transmitted over the channels 181, 182, 183 may comprise audio signals and/or control signals. For example, a first channel may be used to transmit audio data from device 100*a* to device 100*b*, a second channel may be used to receive audio data in device 100*a* that is transmitted from device 100*b*, and a third channel may be used to transfer control signals from device 100*a* to device 100*b* and from device 100*b* to device 100*a*.

In various implementations, one or more of the channels of a hearing system could be used for audio streaming; one or more of the channels could be used for control signals, and/or one or more of the channels could be used for link maintenance, where the phrase "one or more of the channels" could refer to only one channel, some but not all channels, or all the channels. Each channel could have different and/or independent data rates and/or forward error correction schemes.

In one example, a first channel could be selected as an audio streaming channel. For example, the channel having the strongest signal could be selected as the audio streaming channel. A second channel may be used for passing control commands and a third channel could be used as a link maintenance command channel.

Figure 4A:
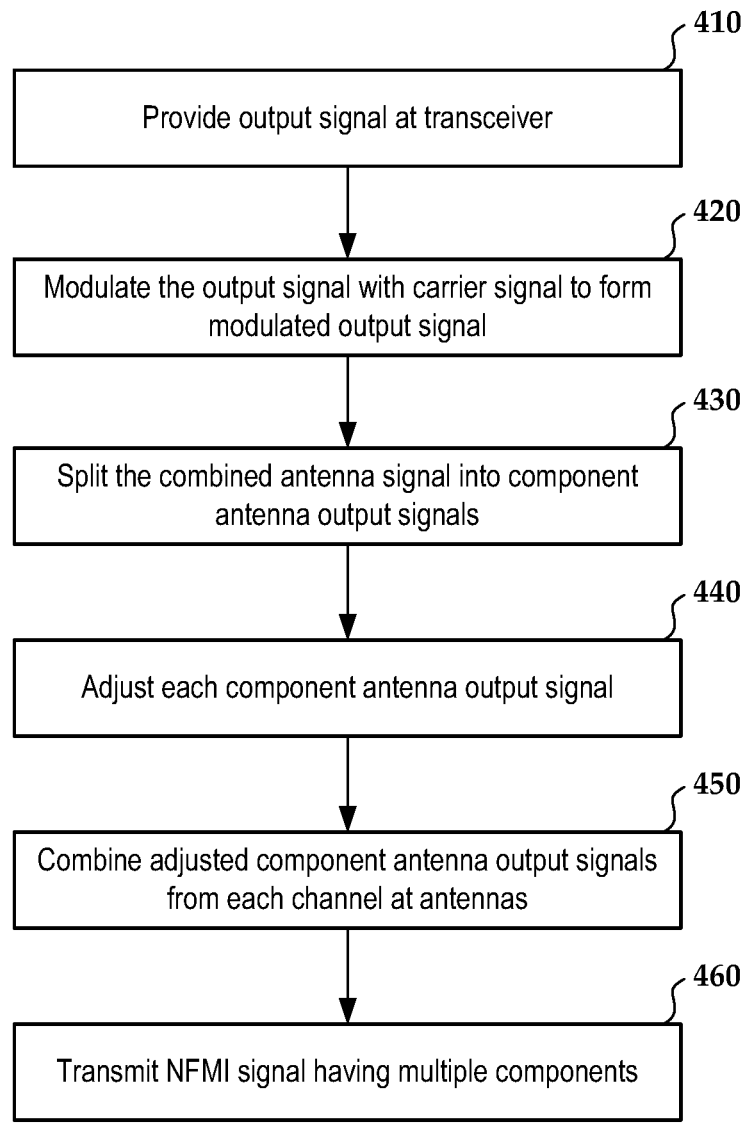
FIG. 4A is a flow diagram that illustrates the operation of a hearing device that is transmitting a communication signal to another hearing device over multiple NFMI communication channels in accordance with some embodiments.
Figure 4B:
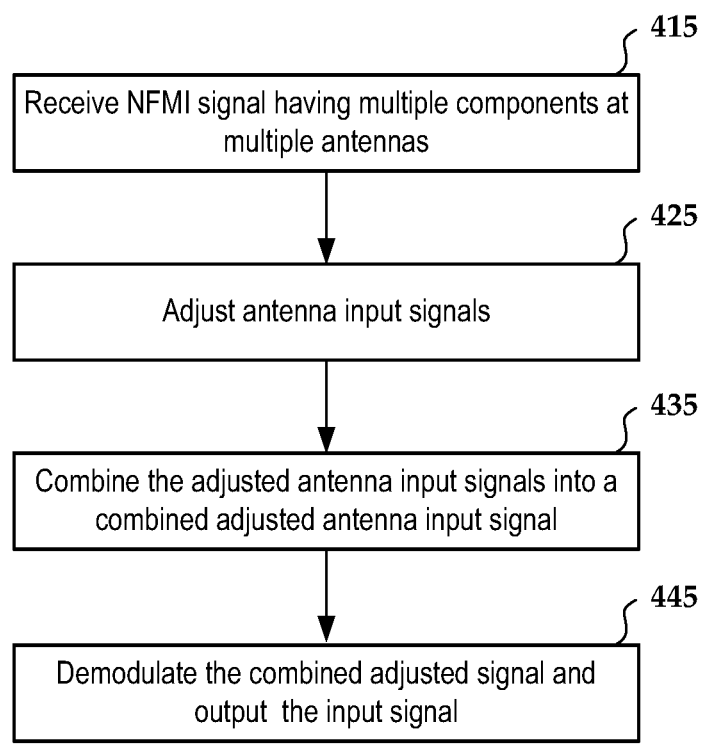
FIG. 4B is a flow diagram that illustrates the operation of a hearing device that is receiving a communication signal from another hearing device over multiple NFMI communication channels in accordance with some embodiments.

FIGS. 4A and 4B respectively illustrate transmit and receive operations of the hearing system 100. The phase and/or gain of signals transmitted by a hearing device over each channel and/or signals received by a hearing device over each channel may be adjusted to compensate for misalignment. In some embodiments, the phase and/or gain of signals received by the hearing device are adjusted and the signals transmitted by the hearing device are not adjusted. In some embodiments, the phase and/or gain of the signals transmitted by the hearing device are adjusted and the signals received by the hearing device are not adjusted. In some embodiments, the phase and/or gain of both transmitted and received signals are adjusted by the hearing device.

According to some embodiments, only one hearing device of the hearing system applies phase and/or gain compensation if the hearing device set the phase and/or gain adjustments during the receive mode and held this setting fixed while in the subsequent transmit mode. In this scenario, the other hearing device would not need to apply phase and/or gain compensation. The hearing device applying the phase and/or gain compensation may draw some additional current. In some scenarios, the compensation task may be passed from one hearing device to the other hearing device to substantially reduce the difference in current drain between the devices.

In some embodiments, the phase and/or gain compensation may be "frozen" after a training sequence until some trigger event occurs, e.g., a problem such as low signal to noise ratio. After detection of the trigger event, the training sequence can be re-run.

In embodiments that use clockwise or anticlockwise magnetic polarization, gain and/or phase adjustments may occur at the transmitter to allow the transmitting device to adjust gain and/or phase to set up the circular polarization. The receiving hearing device may adjust gain and/or phase to properly receive the separate channels along the different axes and polarizations. For example, phase and/or gain adjustments may occur at the receiving hearing device to account for misalignment of the hearing devices on the human head.

FIG. 4A illustrates a transmit operation that may occur over one or more communication channels in accordance with some embodiments. In some embodiments, the phase and/or gain of the transmitted signals are adjusted, e.g., to compensate for misalignment of the antennas of the communicating devices. The first hearing device 100*a* comprises first communication channel circuitry 121*a* which includes transceiver 164*a*, summer/splitter 161*a*, and signal processors 141*a*, 142*a*, 143*a*. The first hearing device 100*a* comprises second communication channel circuitry 122*a* which includes transceiver 165*a*, summer/splitter 162*a*, signal processors 144*a*, 145*a*, 146*a*. The first hearing device 100*a* comprises third communication channel circuitry 123*a* which includes transceiver 166*a*, summer/splitter 163*a*, signal processors 147*a*, 148*a*, 149*a*.

The second hearing device 100*b* comprises first communication channel circuitry 121*b* which includes transceiver 164*b*, summer/splitter 161*b*, signal processors 141*b*, 142*b*, 143*b*; second communication channel circuitry 122*b* which includes transceiver 165*b*, summer/splitter 162*b*, signal processors 144*b*, 145*b*, 146*b*; and third communication channel circuitry 123*b* which includes transceiver 166*b*, summer/splitter 163*b*, signal processors 147*b*, 148*b*, 149*b*.

With regard to the operation of transmitting a signal from the first hearing device 100*a* to the second hearing device 100*b* through any one of the communication channels 181, 182, 183, the first hearing device 100*a* generates or otherwise provides 410 a channel output signal 174*a*, 175*a*, 176*a* at a transceiver 164*a*, 165*a*, 166*a* of the channel 181, 182, 183. The arrows over the numbers 174*a*, 175*a*, 176*a* indicate the direction of communication for signals transmitted from the first hearing device 100*a* to the second hearing device 100*b*. The transceiver 164*a*, 165*a*, 166*a* modulates 420 the output signal 174*a*, 175*a*, 176*a* with a carrier signal to form a differential modulated output signal 171*a*, 172*a*, 173*a*. The arrows over the numbers 171*a*, 172*a*, 173*a* indicate the direction of communication for signals transmitted from the first hearing device 100*a* to the second hearing device 100*b*. A signal splitter 161*a*, 162*a*, 163*a* splits 430 the modulated output signal 171*a*, 172*a*, 173*a* into three differential component output signals 151*a*-153*a*, 154*a*-156*a*, 157*a*-159*a*. The arrows over the numbers 151*a*-153*a*, 154*a*-156*a*, 157*a*-159*a* indicate the direction of communication for signals transmitted from the first hearing device 100*a* to the second hearing device 100*b*. The gain and/or phase of each component output signal 151*a*-153*a*, 154*a*-156*a*, 157*a*-159*a* may be respectively individually adjusted 440 by the signal processors 141*a*-143*a*, 144*a*-146*a*, 147*a*-149*a*. As discussed in more detail below, the amount of phase and/or gain adjustment applied by the signal processors 141*a*-143*a*, 144*a*-146*a*, 147*a*-149*a* to each of the component output signals 151*a*-153*a*, 154*a*-156*a*, 157*a*-159*a* may be determined according to a previously implemented training sequence. The individual phase and/or gain adjustments applied to the component output signals 151*a*-153*a*, 154*a*-156*a*, 157*a*-159*a* can compensate for misalignment between the antennas 111*a*, 112*a*, 113*a*, of the first hearing device 100*a* and the antennas 111*b*, 112*b*, 113*b* of the second hearing device 100*b*.

For simultaneous transmit operation of the first hearing device 100*a* over two or more of the first 181, second 182, and/or third 183 communication channels, the differential adjusted component output signals 131*a*-133*a* of the first channel 181 are combined 450 with the corresponding differential adjusted component output signals 134*a*-136*a* of the second channel 182 and the corresponding differential adjusted component output signals, 137*a*-139*a* of the third channel 183 at the antennas 111*a*, 112*a*, 113*a*. More specifically, the adjusted component output signal 131*a* of the first channel 181 is combined with the adjusted component output signal 134*a* of the second channel 182 and with the adjusted component output signal 137*a* of the third channel 183 at antenna 111*a*; adjusted component output signal 132*a* of the first channel 181 is combined with the adjusted component output signal 135*a* of the second channel 182 and with the adjusted component output signal 138*a* of the third channel 183 at antenna 112*a*; and adjusted component output signal 133*a* of the first channel 181 is combined with the adjusted component output signal 136*a* of the second channel 182 and with the adjusted component output signal 139*a* of the third channel 183 at antenna 113*a*. The NFMI communication signal 180 for the first, second, and third channels 181, 182, 183 is transmitted 460 from antennas 111*a*, 112*a*, 113*a*.

With regard to the operation of transmitting from the second hearing device 100*b* to the first hearing device 100*a* through any one or more of the communication channels 181, 182, 183, the second hearing device 100*b* generates or otherwise provides 410 an output signal 174*b*, 175*b*, 176*b* at a transceiver 164*b*, 165*b*, 166*b* for the channel 181, 182, 183. The arrows over the numbers 174*b*, 175*b*, 176*b* indicate the direction of communication for signals transmitted from the second hearing device 100*b* to the first hearing device 100*a*. The transceiver 164*b*, 165*b*, 166*b* modulates 420 the output signal 174*b*, 175*b*, 176*b* with a carrier signal to form a differential modulated output signal 171*b*, 172*b*, 173*b*. The arrows over the numbers 171*b*, 172*b*, 173*b* indicate the direction of communication for signals transmitted from the second hearing device 100*b* to the first hearing device 100*a*. In some embodiments, the transceiver 164*b*, 165*b*, 166*b* may be configured to add an identification (ID) header that includes the channel ID to the payload of the differential modulated output signal 171*b*, 172*b*, 173*b* for each channel 181, 182, 183. A signal splitter 161*b*, 162*b*, 163*b* splits 430 the modulated output signal 171*b*, 172*b*, 173*b* into multiple differential component output signals 151*b*-153*b*, 154*b*-156*b*, 157*b*-159*b*. The arrows over the numbers 151*b*-153*b*, 154*b*-156*b*, 157*b*-159*b* indicate the direction of communication for signals transmitted from the second hearing device 100*b* to the first hearing device 100*a*. The gain and/or phase of each component output signal 151*b*-153*b*, 154*b*-156*b*, 157*b*-159*b* may be adjusted 440 by the signal processors 141*b*-143*b*, 144*b*-146*b*, 147*b*-149*b*, respectively. As discussed in more detail below, the amount of phase and/or gain adjustment applied by the signal processors 141*b*-143*b*, 144*b*-146*b*, 147*b*-149*b* to each of the component output signals 151*b*-153*b*, 154*b*-156*b*, 157*b*-159*b* may be determined according to a previously implemented training sequence. The phase and/or gain adjustments applied to the component output signals 151*b*-153*b*, 154*b*-156*b*, 157*b*-159*b* compensate for misalignment between the antennas 111*b*, 112*b*, 113*b*, of the second hearing device 100*b* and the antennas 111*a*, 112*a*, 113*a* of the first hearing device 100*a*.

For simultaneous transmit operation of the second hearing device 100*b* over two or more of the first 181, second 182, and/or third 183 communication channels, the differential adjusted component output signals 131*b*-133*b* of the first channel 181 are combined 450 with the corresponding differential adjusted component output signals 134*b*-136*b* of the second channel 182 and corresponding differential adjusted component output signals, 137*b*-139*b* of the third channel 183 at the antennas 111*b*, 112*b*, 113*b*. More specifically, the adjusted component output signal 131*b* of the first channel 181 is combined with the adjusted component output signal 134*b* of the second channel 182 and with the adjusted component output signal 137*b* of the third channel 183 at antenna 111*a*; adjusted component output signal 132*b* of the first channel 181 is combined with the adjusted component output signal 135*b* of the second channel 182 and with the adjusted component output signal 138*b* of the third channel 183 at antenna 112*b*; and adjusted component output signal 133*b* of the first channel 181 is combined with the adjusted component output signal 136*b* of the second channel 182 and with the adjusted component output signal 139*b* of the third channel 183 at antenna 113*b*. The NFMI communication signal 180 for the first, second, and third channels 181, 182, 183 is transmitted 460 from antennas 111*b*, 112*b*, 113*b*.

FIG. 4B illustrates a receive operation over one or more communication channels in accordance with some embodiments in which the phase and/or gain of the received signals are adjusted to compensate for misalignment of the antennas of the communicating hearing devices. The first hearing device 100*a* may receive signals from the second hearing device 100*b* through any one or more of the communication channels 181, 182, 183. An NFMI signal 180 having multiple components, e.g., multiple orthogonal components, is transmitted from antennas 111*b*, 112*b*, 113*b* of the second hearing device 100*b* and is received 415 at antennas 111*a*, 112*a*, 113*a* of the first hearing device 100*a*. The antennas 111*a*, 112*a*, 113*a* convert the NFMI signal 180 to differential component antenna input signals 114*a*, 115*a*, 116*a*. The phase and/or gain of the antenna input signals 114*a*, 115*a*, 116*a* may be adjusted 425 by signal processors 141*a*, 142*a*, 143*a*, respectively, to produce adjusted differential input signals 151*a'*-153*a'* for the first channel 181; adjusted differential input signals 154*a'*-156*a'* for the second channel 182; and adjusted differential input signals 157*a'*-159*a'* for the second channel 183. The adjusted differential input signals 151*a'*-153*a'*, 154*a'*-156*a'*, 157*a'*-159*a'* are respectively combined 435 by summer 161*a*, 162*a*, 163*a* to produce a combined differential input signal 171*a'*, 172*a'*, 173*a'*. The combined differential input signal 171*a'*, 172*a'*, 173*a'* is demodulated by the transceiver 164*a*, 165*a*, 166*a*.

The transceiver 164*a*, 165*a*, 166*a* provides 445 the demodulated channel input signal 174*a'*, 175*a'*, 176*a'* to the first hearing device. The arrows positioned under or over the reference numbers in FIG. 1 indicate the direction of the communication.

The second hearing device 100*b* may receive signals from the first hearing device 100*a* through any one or more of the communication channels 181, 182, 183. An NFMI signal 180 having multiple components, e.g., multiple orthogonal components, is transmitted from antennas 111*a*, 112*a*, 113*a* of the first hearing device 100*a* and is received 415 at antennas 111*b*, 112*b*, 113*b* of the second hearing device 100*b*. The antennas 111*b*, 112*b*, 113*b* convert the NFMI signal 180 to differential component antenna input signals 114*a*, 115*b*, 116*b*. The phase and/or gain of the antenna input signals 114*b*, 115*b*, 116*b* are adjusted 425 by signal processors 141*b*, 142*b*, 143*b*, respectively, to produce adjusted differential input signals 151*b'*-153*b'* for the first channel 181; adjusted differential input signals 154*b'*-156*b'* for the second channel 182; and adjusted differential input signals 157*b'*-159*b'* for the third channel 183. The adjusted differential input signals 151*b'*-153*b'*, 154*b'*-156*b'*, 157*b'*-159*b'* are respectively combined 435 by summer 161*b*, 162*b*, 163*b* to produce a combined differential input signal 171*b'*, 172*b'*, 173*b'*. The combined differential input signal 171*b'*, 172*b'*, 173*b'* is demodulated by the transceiver 161*b*, 162*b*, 163*b*. The transceiver 164*b*, 165*b*, 166*b* provides 445 the demodulated input signal 174*b'*, 175*b'*, 176*b'* for the respective channel 181, 182, 183 to the second hearing device 100*b*.

Figure 5:
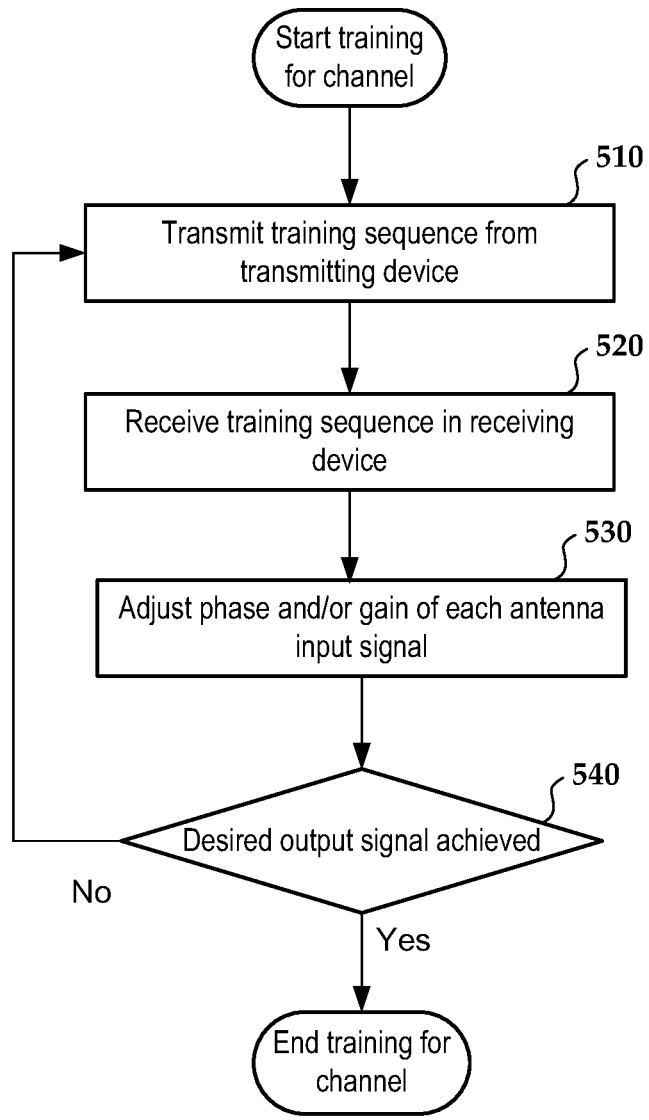
FIG. 5 is a flow diagram illustrating an approach for providing a training sequence used to determine adjustments to the phase and/or gain of one or more signals in accordance with some embodiments.

FIG. 5 is a flow diagram illustrating an approach for providing a training sequence that can be used to determine adjustments to the phase and/or gain of one or more signals. In various embodiments, the antenna input signals 114*a*-116*a* of the first device 100*a*, the antenna input signals 114*b*-116*b* of the second device 100*b*, the component antenna output signals 131*a*-133*a*, 134*a*-136*a*, 137*a*-139*a* of the first device 100*a* for each channel 181, 182, 183; and/or the component antenna output signals 131*b*-133*b*, 134*b*-136*b*, 137*b*-139*b* of the second device 100*b* for each channel 181, 182, 183 may be adjusted so that misalignment-related signal losses are reduced.

According to some embodiments, a training sequence is transmitted 510 by the transmitting device 100*b*, 100*a*, e.g., at the beginning of an NFMI transmission. For each channel 181, 182, 183, the receiving device 100*a*, 100*b* receives 520 the training sequence and adjusts 530, e.g., slews, one or both of the amplitude and phase of the input antenna signals 114*a*, 115*a*, 116*a* until a desired signal 174*a'* 175*a'*, 176*a'* from the channel 181, 182, 183 is achieved 540. This process may be repeated for each channel to achieve the desired signal from each channel. Adjusting the phase and/or gain of each of the antenna input signals for each channel can provide adequate isolation to create and sustain three independent communication channels.

The training sequence could be included in the preamble and/or the payload of the communication signal. In some implementations, a portion of the preamble of a signal would include the training sequence. For example, each communication channel could have its own unique preamble that would be correlated independently with corresponding channel circuitry in the receiving device. In some embodiments, the preamble may include a channel ID, for example.

In some embodiments, after the phase and/or gain adjustments are determined for a channel 181, 182, 183 by one of the hearing devices 100*a*, 100*b*, the phase and/or gain adjustments for that channel 181, 182, 183 may be sent to the other hearing device 100*b*, 100*a*.

The channel circuitry 121a, 122a, 123a, 121b, 122b, 123b of each device 100a, 100b may operate reciprocally in transmit mode. After a training sequence is implemented for a channel 181, 182, 183, the phase and/or gain adjustment settings determined from the training sequence for the channel 181, 182, 183 by the hearing device 100a, 100b could be held constant during a subsequent transmission from the device 100a, 100b. In this scenario, the summer/splitter components 161a, 162a, 163a, 161b, 162b, 163b operate to split the combined output signal 171a, 172a, 173a, 171b, 172b, 173b, and each signal processor 141a-143a, 144a-146a, 147a-149a, 141b-143b, 144b-146b, 147b-149b adjusts the three component antenna output signals 151a-153a, 154a-156a, 157a-159a, 151b-153b, 154b-156b, 157b-159b according to the previously determined adjustment settings when the device 100a, 100b operates in transmit mode.

A hearing system can have one or more communication links in addition to the NFMI communication link described herein. The additional one or more communication links can be used to supplement the implementations described herein. For example, during initial training, the additional one or more communication links may be used to transfer parameters, e.g., phase and/or gain adjustments, from one hearing device to the other. The use of communication links other than the NFMI link in this manner can reduce the potential for the gain and/or phase adjustments from being set at values that degrade NFMI communication due to poorly converged parameters.

Embodiments disclosed herein include

Embodiment 1

A hearing device comprising:
a first magnetic antenna oriented along a first axis;
a second magnetic antenna oriented along a second axis different from the first axis;
a third magnetic antenna oriented along a third axis different from the first and second axes;
first channel circuitry coupled to each of the antennas and configured to transceive and process antenna signals of each of the antennas, the antennas and the first channel circuitry configured to communicate with another hearing device via a near field magnetic induction (NFMI) signal through a first near field magnetic induction (NFMI) communication channel;
second channel circuitry coupled to each of the antennas and configured to transceive and process the antenna signals of each of the antennas, the antennas and the second channel circuitry configured to communicate with the other device via the NFMI signal through a second NFMI communication channel; and
third channel circuitry coupled to each of the antennas and configured to transceive and process the antenna signals of each of the antennas, the antennas and the third channel circuitry configured to communicate with the other device via the NFMI signal through a third NFMI communication channel.

Embodiment 2

The device of embodiment 1, wherein the first, second, and third axes are substantially orthogonal to one another.

Embodiment 3

The device of any of embodiments 1 through 2, wherein:
the first NFMI communication channel communicates predominantly through a first linear polarization component of the NFMI signal;
the second NFMI communication channel communicates predominantly through a second linear polarization component of the NFMI signal; and
the third NFMI communication channel communicates predominantly through a third linear polarization component of the NFMI signal.

Embodiment 4

The device of any of embodiments 1 through 2, wherein:
the first NFMI communication channel communicates predominantly through a clockwise rotating polarization component of the NFMI signal;
the second NFMI communication channel communicates predominantly through an anticlockwise rotating polarization component of the NFMI signal; and
the third NFMI communication channel communicates predominantly through a linear polarization component of the NFMI signal.

Embodiment 5

The device of any of embodiments 1 through 4, wherein each of the first, second, and third antennas are wound around a common core.

Embodiment 6

The device of any of embodiments 1 through 5, wherein each of the first, second, and third channel circuitry includes a signal processor configured to adjust a phase and a gain of each antenna signal to compensate for misalignment of one or more of the antennas.

Embodiment 7

The device of any of embodiments 1 through 6, wherein each of the first, second, and third channel circuitry includes a signal processor configured to adjust a phase and a gain of each antenna signal based on a training sequence received from the other device.

Embodiment 8

The device of embodiment 7, wherein each of the first, second, and third channel circuitry is configured to adjust the phase and gain of each antenna signal during reception of the training sequence until a predetermined signal from the NFMI communication channel is achieved.

Embodiment 9

The device of embodiment 7, wherein each NFMI communication channel is associated with an identification (ID), and the training sequence is embedded along with the ID in a preamble of an NFMI signal received through the NFMI communication channel from the other device.

Embodiment 10

The device of embodiment 7, wherein the training sequence is embedded in a payload of an NFMI signal received through the NFMI communication channel from the other device.

Embodiment 11

The device of any of embodiments 1 through 10, wherein:
the first NFMI communication channel communicates simultaneously with the second NFMI communication channel; and
the first NFMI communication channel communicates at the same frequency as the second NFMI communication channel.

Embodiment 12

The device of any of embodiments 1 through 11, wherein each NFMI communication channel is a reciprocal channel.

Embodiment 13

The device of any of embodiments 1 through 12, wherein each of the first, second, and third channel circuitry includes:
signal processors configured receive input antenna signals from the antennas and to apply phase and gain adjustments to the input antenna signals and to output adjusted antenna signals;
a summer coupled to the signal processors and configured to combine the adjusted antenna signals and to output a combined antenna signal; and
a transceiver configured to convert the combined antenna signal to a channel signal.

Embodiment 14

The device of any of embodiments 1 through 12, wherein each of the first, second, and third channel circuitry includes:
a transceiver configured to convert a channel signal to a combined antenna signal;
a splitter configured to split the combined antenna signal into unadjusted antenna signals; and
signal processors configured apply phase and gain adjustments to the unadjusted antenna signals and to provide adjusted output antenna signals to the antennas.

Embodiment 15

The device of any of embodiments 1 through 14, wherein the first NFMI communication channel transmits audio signals to the other device and the second NFMI communication channel receives audio signals from the other device.

Embodiment 16

The device of embodiments 1 through 14, wherein the first NFMI communication channel transceives audio signals and the second NFMI communication channel transceives control or link signals

Embodiment 17

A hearing system comprising:
a first hearing device as in claim 1; and
a second hearing device as in claim 1, wherein the first hearing device and the second hearing device are configured to communicate through the first, second, and third NFMI channels.

Embodiment 18

The hearing system of embodiment 17, wherein:
the second hearing device is configured to transmit a training sequence to the first hearing device over one or more of the NFMI channels; and
the first hearing device is configured to adjust a phase and a gain of one or more of the antenna signals based on the training sequence.

Embodiment 19

A method of operating a hearing system, comprising:
communicating between a first hearing device and a second hearing device through at least first and second independent near field magnetic induction (NFMI) communication channels, comprising:
sending an NFMI signal from one or more of a first magnetic antenna and a second magnetic antenna of the first device, the first magnetic antenna of the first device oriented along a first axis and the second magnetic antenna of the first device oriented along a second axis different from the first axis;
detecting the NFMI signal at one or more of a first magnetic antenna and a second magnetic antenna of the second device, the first magnetic antenna of the second device oriented along a third axis and the second magnetic antenna of the second device oriented along a fourth axis that is different from the third axis;
outputting a first antenna signal in response to a first magnetic polarization component of the detected NFMI signal;
outputting a second antenna signal in response to a second magnetic polarization component of the detected NFMI signal;
adjusting a gain and a phase of each of the first and second antenna signals and outputting an adjusted first antenna signal and an adjusted second antenna signal; and
summing the first and second adjusted antenna signals.

Embodiment 20

The method of embodiment 19, wherein communicating between the first hearing device and the second hearing device through at least the first and second independent NFMI communication channels includes communicating between the first hearing device and the second hearing device through the first and second independent NFMI communication channels and a third independent NFMI communication channel.

It is understood that the embodiments described herein may be used with any hearing device without departing from the scope of this disclosure. It is further understood that the embodiments described may be used with other body worn devices other than hearing devices without departing from the scope of this disclosure. Other body worn devices can include medical sensors, personal fitness devices and/or other devices.

The devices depicted in the figures are intended to demonstrate the subject matter, but not in a limited, exhaustive, or exclusive sense. It is also understood that the present subject matter can be used with a device designed for use in the right ear or the left ear or both ears of the wearer.

It is understood that the hearing devices referenced in this patent application may include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, audio decoding, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to implement a number of signal processing tasks. In such embodiments, analog components are in communication with the processor to perform signal tasks, such as microphone reception, or receiver sound embodiments (e.g., in applications where such transducers are used). In various embodiments, different realizations of the block diagrams, circuits, and processes set forth herein may occur without departing from the scope of the present subject matter.

The hearing devices disclosed herein can be capable of wireless communication with accessory devices, including MP3 players, mobile telephones, personal computers, and television. Communication with accessory devices may employ variety of communication protocols operation over a range of frequencies, such as the Bluetooth® communication protocol operating at 2.4 GHz. Furthermore, hearing devices may communicate with each other by sending control signals, synchronization signals, and/or by streaming audio signals between the devices.

The present subject matter is demonstrated for hearing devices, including hearables, hearing assistance devices, and/or hearing aids, including but not limited to, behind-the-ear (BTE), in-the-ear (ITE), in-the-canal (ITC), receiver-in-canal (RIC), or completely-in-the-canal (CIC) type hearing devices. It is understood that behind-the-ear type hearing devices may include devices that reside substantially behind the ear or over the ear.

The hearing devices may include hearing devices of the type with receivers associated with the electronics portion of the behind-the-ear device, or hearing devices of the type having receivers in the ear canal of the user, including but not limited to receiver-in-canal (RIC) or receiver-in-the-ear (RITE) designs. The present subject matter can also be used in cochlear implant type hearing devices such as deep insertion devices having a transducer, such as a receiver or microphone, whether custom fitted, standard, open fitted or occlusive fitted. It is understood that other hearing devices not expressly stated herein may be used in conjunction with the present subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

The invention claimed is:

1. A hearing device comprising:
a first magnetic antenna oriented along a first axis;
a second magnetic antenna oriented along a second axis different from the first axis;
a third magnetic antenna oriented along a third axis different from the first and second axes;
first channel circuitry coupled to each of the antennas and configured to transceive and process antenna signals of each of the antennas, the antennas and the first channel circuitry configured to communicate with another hearing device via a near field magnetic induction (NFMI) signal through a first near field magnetic induction (NFMI) communication channel;
second channel circuitry coupled to each of the antennas and configured to transceive and process the antenna signals of each of the antennas, the antennas and the second channel circuitry configured to communicate with the other device via the NFMI signal through a second NFMI communication channel; and
third channel circuitry coupled to each of the antennas and configured to transceive and process the antenna signals of each of the antennas, the antennas and the third channel circuitry configured to communicate with the other device via the NFMI signal through a third NFMI communication channel.

2. The device of claim 1, wherein the first, second, and third axes are substantially orthogonal to one another.

3. The device of claim 1, wherein:
the first NFMI communication channel communicates predominantly through a first linear polarization component of the NFMI signal;
the second NFMI communication channel communicates predominantly through a second linear polarization component of the NFMI signal; and
the third NFMI communication channel communicates predominantly through a third linear polarization component of the NFMI signal.

4. The device of claim 1, wherein:
the first NFMI communication channel communicates predominantly through a clockwise rotating polarization component of the NFMI signal;
the second NFMI communication channel communicates predominantly through an anticlockwise rotating polarization component of the NFMI signal; and
the third NFMI communication channel communicates predominantly through a linear polarization component of the NFMI signal.

5. The device of claim 1, wherein each of the first, second, and third antennas are wound around a common core.

6. The device of claim 1, wherein each of the first, second, and third channel circuitry includes a signal processor configured to adjust a phase and a gain of each antenna signal to compensate for misalignment of one or more of the antennas.

7. The device of claim 1, wherein each of the first, second, and third channel circuitry includes a signal processor configured to adjust a phase and a gain of each antenna signal based on a training sequence received from the other device.

8. The device of claim 7, wherein each of the first, second, and third channel circuitry is configured to adjust the phase and gain of each antenna signal during reception of the training sequence until a predetermined signal from the NFMI communication channel is achieved.

9. The device of claim 7, wherein each NFMI communication channel is associated with an identification (ID), and the training sequence is embedded along with the ID in a preamble of an NFMI signal received through the NFMI communication channel from the other device.

10. The device of claim 7, wherein the training sequence is embedded in a payload of an NFMI signal received through the NFMI communication channel from the other device.

11. The device of claim 1, wherein:
the first NFMI communication channel communicates simultaneously with the second NFMI communication channel; and
the first NFMI communication channel communicates at the same frequency as the second NFMI communication channel.

12. The device of claim 1, wherein each NFMI communication channel is a reciprocal channel.

13. The device of claim 1, wherein each of the first, second, and third channel circuitry includes:
signal processors configured receive input antenna signals from the antennas and to apply phase and gain adjustments to the input antenna signals and to output adjusted antenna signals;
a summer coupled to the signal processors and configured to combine the adjusted antenna signals and to output a combined antenna signal; and
a transceiver configured to convert the combined antenna signal to a channel signal.

14. The device of claim 1, wherein each of the first, second, and third channel circuitry includes:
a transceiver configured to convert a channel signal to a combined antenna signal;
a splitter configured to split the combined antenna signal into unadjusted antenna signals; and
signal processors configured apply phase and gain adjustments to the unadjusted antenna signals and to provide adjusted output antenna signals to the antennas.

15. The device of claim 1, wherein the first NFMI communication channel transmits audio signals to the other device and the second NFMI communication channel receives audio signals from the other device.

16. The device of claim 1, wherein the first NFMI communication channel transceives audio signals and the second NFMI communication channel transceives control or link signals.

17. A hearing system comprising:
a first hearing device as in claim 1; and
a second hearing device as in claim 1, wherein the first hearing device and the second hearing device are configured to communicate through the first, second, and third NFMI channels.

18. The hearing system of claim 17, wherein:
the second hearing device is configured to transmit a training sequence to the first hearing device over one or more of the NFMI channels; and
the first hearing device is configured to adjust a phase and a gain of one or more of the antenna signals based on the training sequence.

* * * * *